Sept. 26, 1961  W. R. MATTHEWS  3,001,903
MANUFACTURE OF WALL BOARD
Filed Nov. 25, 1955  6 Sheets-Sheet 1
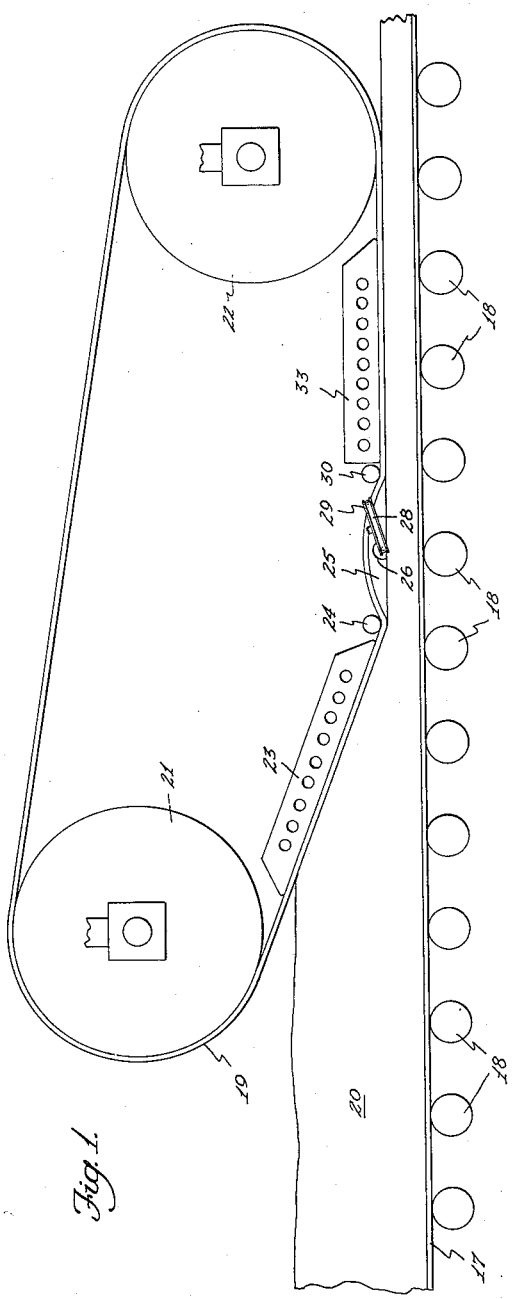
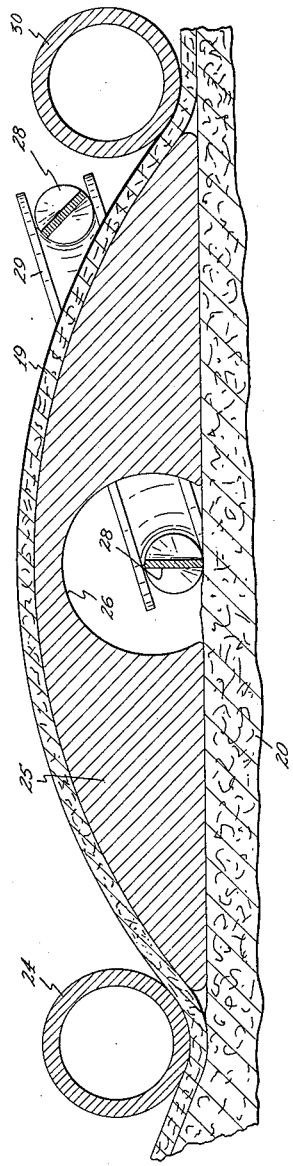
INVENTOR.
William R. Matthews
BY
Atty.

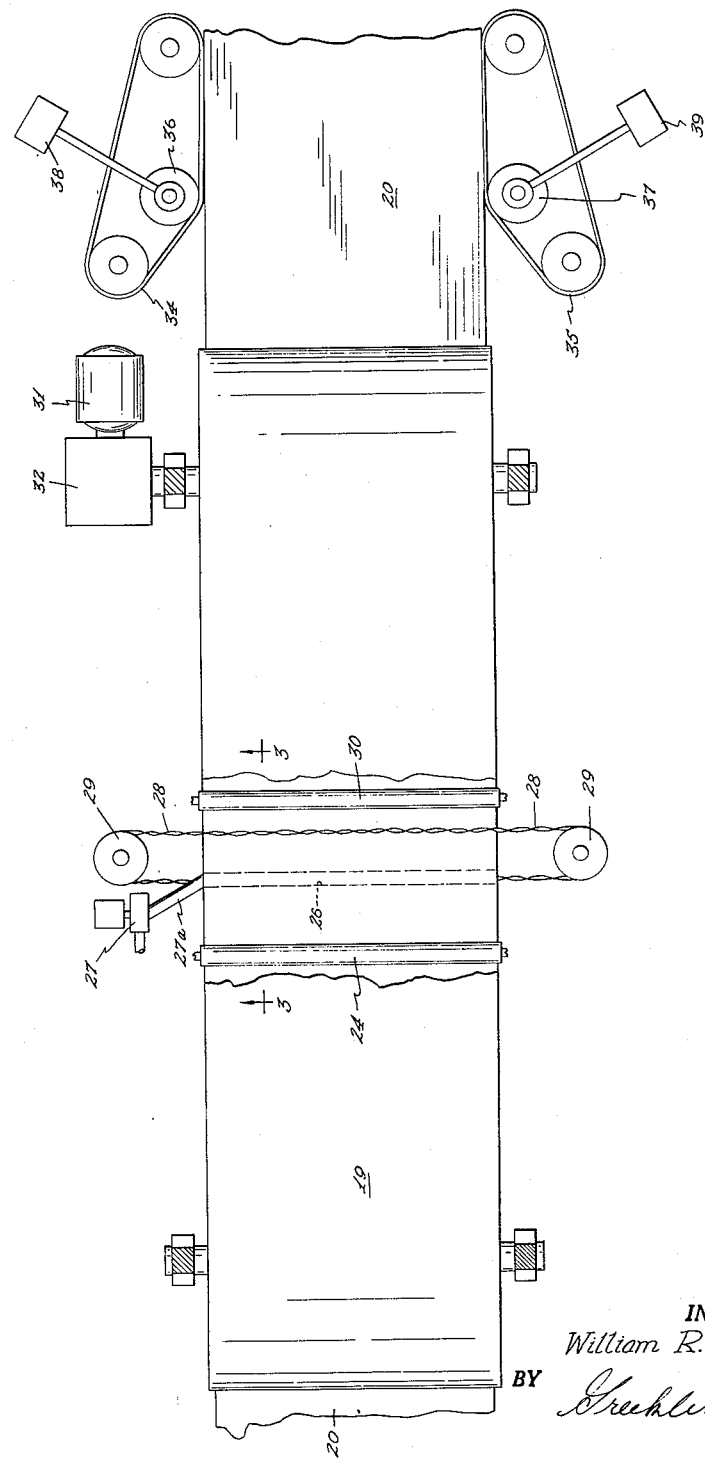

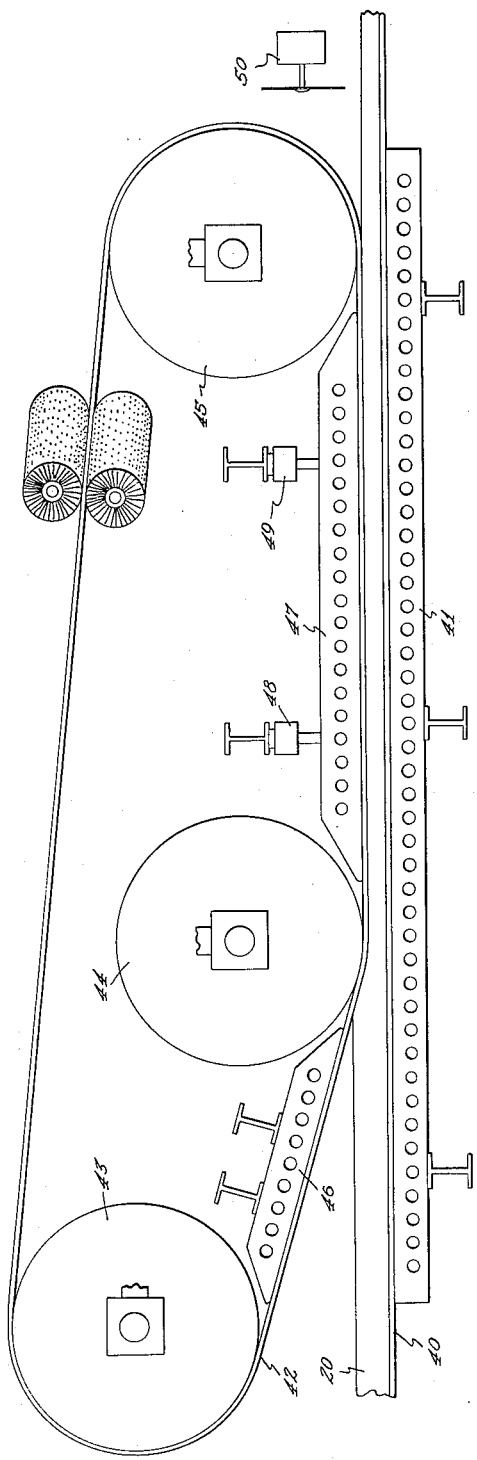

Sept. 26, 1961 W. R. MATTHEWS 3,001,903
MANUFACTURE OF WALL BOARD
Filed Nov. 25, 1955 6 Sheets-Sheet 4

INVENTOR.
William R. Matthews
BY
Atty.

Sept. 26, 1961 W. R. MATTHEWS 3,001,903
MANUFACTURE OF WALL BOARD
Filed Nov. 25, 1955 6 Sheets-Sheet 5

INVENTOR.
William R. Matthews
BY
Atty.

Sept. 26, 1961 W. R. MATTHEWS 3,001,903
MANUFACTURE OF WALL BOARD
Filed Nov. 25, 1955 6 Sheets-Sheet 6

INVENTOR.
William R. Matthews
BY *Greehwells.*
Atty.

United States Patent Office 3,001,903
Patented Sept. 26, 1961

3,001,903
MANUFACTURE OF WALL BOARD
William R. Matthews, W. 417 2nd Ave., Spokane, Wash.
Filed Nov. 25, 1955, Ser. No. 549,034
7 Claims. (Cl. 154—45.9)

My invention relates to the manufacture of wall board. It is the purpose of my invention to provide a wall board from fibers such as wood fibers, etc. with a center seal of metal foil, such as aluminum foil, and dead air pockets hermetically sealed by the foil so that the finished wall board has a central vapor barrier and heat reflector with the air pockets between the two walls of the vapor barrier.

It is also a purpose of my invention to provide an improved method of forming the wall board whereby to improve the uniformity of the board, both in density and thickness.

My invention contemplates the making of wall board from such material as wood chips and waste in such a manner as to retain the lignin as a natural binder and other suitable binders are added to bond the fibers into a light weight rigid board structure. The wood chips, etc. are softened by steaming and then broken up by grinding to produce a fiber that can be felted. The felting is done by air so that the entire preparation up to the point of compressing, avoids using water or digestive liquors and therefore does not present a pollution problem. Very little drying is needed.

A continuous felted layer of fibers with a binder incorporated is first partially compressed and heated, then shaved as it advances to remove uneven lumps and further smoothed out as it is heated, to prepare for further compression and foaming. The side edges of the fiber layer are laterally compressed by vibration. Thereafter, the layer travels between caul belts where further compression is accomplished. The continuous strip of soft board thus formed is cut by a flying shear into equal lengths. The lengths then are coated on one face with an adhesive and a sealing sheet is laid against the coated face and pressed into place by calender rolls. Next the two faced boards are fed to an embossing press which deforms the sealed coated faces of the boards by pressing shallow indentations therein and cures the adhesive binder in the board. Now two boards so indented and cured are placed face to face with the two covered indented faces meeting, adhesive being applied to the raised portions of one or both of the indented faces. The boards so assembled are passed through calendering rolls and are ready for final sizing by trimming of the side and end edges.

The resulting product is a light weight sandwich type board, vapor sealed at the center plane and having multiple air pockets whereby to increase the insulating value of the board.

Having generally outlined the nature of the product and the method of producing it, a detailed description of the apparatus and the procedures employed will be given, reference being made to the accompanying drawings. It should be understood however, that the drawings and description are illustrative only and that various modifications may be made without departing from the scope of the invention as defined in the claims.

In the drawings:

FIGURE 1 is a side view of the apparatus used in the first stage or initial compression of a felted stream of wood fibers which have been prepared as described hereinbefore and coated with a binder;

FIGURE 2 is a plan view of the apparatus for initially compressing the coated fibers;

FIGURE 3 is an enlarged sectional view taken on the line 3—3 of FIGURE 2;

FIGURE 4 is a side view of the apparatus used in the second stage of compression of the fibers;

Figures 7, 12:
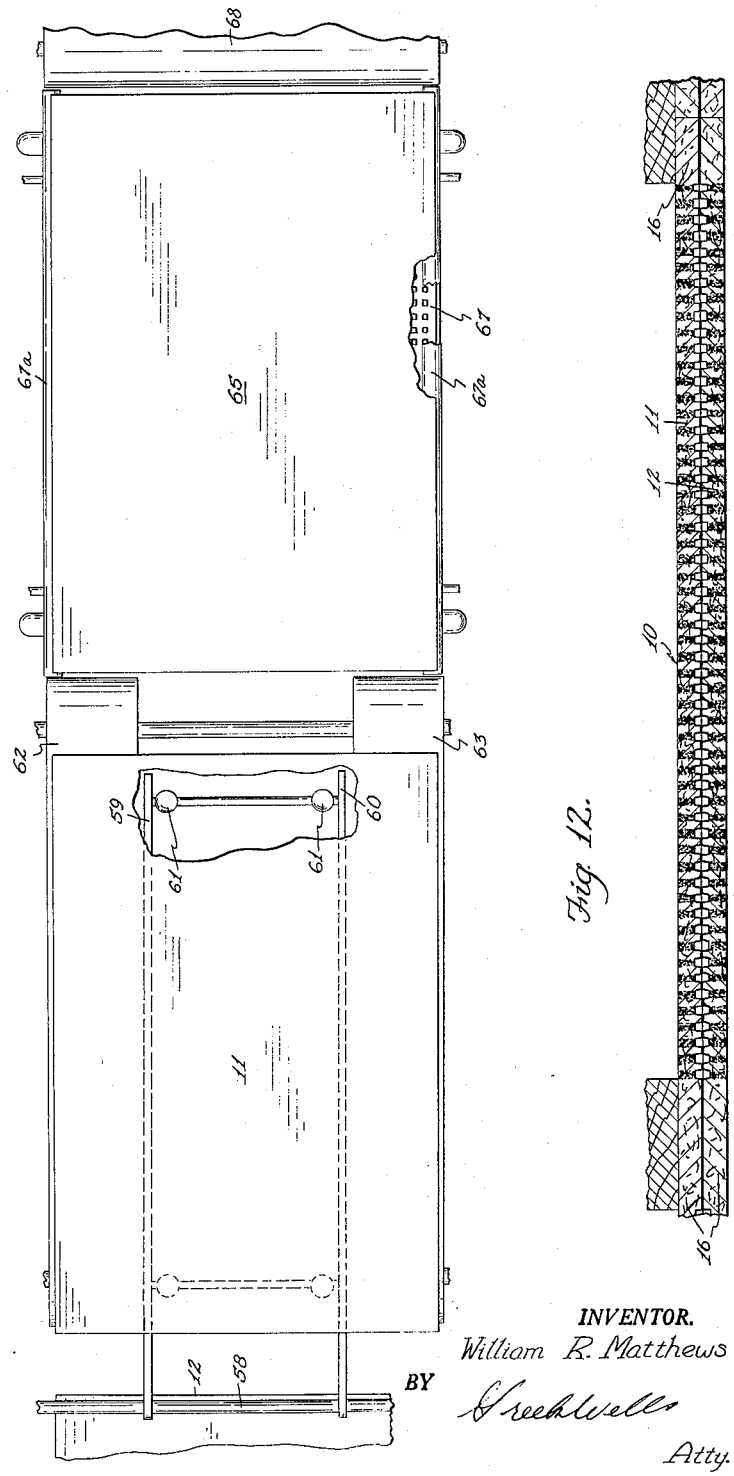
FIGURE 7 is a plan view illustrating the transfer of boards from the turning mechanism to the embossing press.
FIGURE 12 is a sectional view showing the board used as sheathing in a dwelling and secured to frame members.
Figure 10:
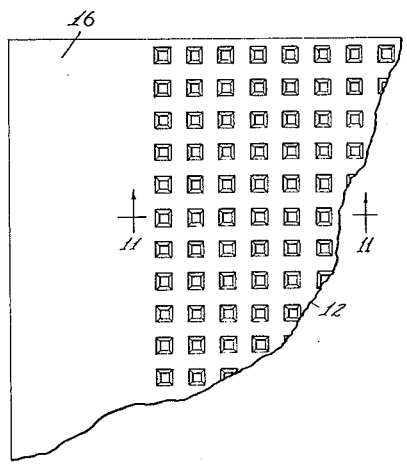
FIGURE 10 is a fragmentary side view of a board portion that has been embossed.
Figure 11:
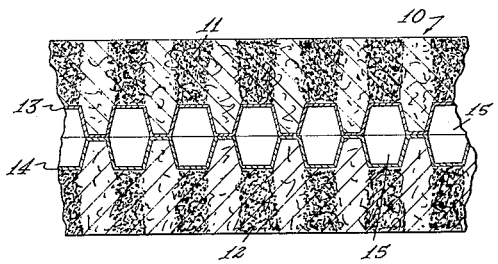
FIGURE 11 is an enlarged sectional view taken on the line 11—11 of FIGURE 10.

Referring now to the drawings and in particular to FIGURES 10, 11 and 12, these figures illustrate a novel wall board constructed in accordance with my invention. The wall board 10 is made up of two board portions 11 and 12 which have facings 13 and 14 of a thin sheet material such as a metal foil. Aluminum foil is particularly useful for this purpose because of its heat reflecting qualities. The facings 13 and 14 follow the embossed meeting faces of the portions 11 and 12 so as to provide air spaces 15 in the form of pockets throughout the meeting faces of the board portions 11 and 12. For convenience in fastening the board to studding and the like, the dies which emboss the board portions 11 and 12 and the facing foil 13 and 14 may provide unembossed portions 16 on the board portions 11 and 12 so that a part of a component board that rests against a studding will be of full thickness without any of the pockets 15 provided therein. The board 10 has its board portions 11 and 12 made up of compressed fibers such as wood fibers obtained from wood chips and wood waste. As described before in the specification, the wood fibers are prepared in such a fashion (steaming and grinding) as to retain the lignin content of the wood to as great a degree as possible. This lignin content is supplemented by a suitable adhesive binder such as a thermo setting resin of the phenol formaldehyde or phenol resorcinol type, so that when the fibers are compressed under heat the lignin and the resin binder together will bond the particles into a rigid board. With the two layers 13 and 14 of unbroken foil between the board portions 11 and 12, there is a vapor seal which prevents the accumulation of moisture in the outer board portion through absorption from the inner board portion in a structural wall. Likewise there is less tendency for vapor accumulation in the inner wall board portion because of the insulating effect of the air spaces 15 between the two board portions.

In order to form the board 10, wood particles are prepared as hereinbefore described and are air felted together to provide a thick layer 20 of fibers which is carried along on a supporting belt 17 that travels on rollers 18. The layer of fibers indicated at 20, may start out with a thickness of the order of 8 inches. These fibers of course, are already coated with the adhesive resin. The fibers are first pressed down by a belt 19 which travels around rollers 21 and 22 and which is driven by these rollers. The belt 19 travels beneath an inclined heated platen 23 and beneath a roller 24 so as to bring the thickness of the layer 20 down to approximately one third or one fourth of its original thickness. The belt 19, after passing beneath the roller 24, rides up over a stationary shoe 25 and the belt 17 carries the partially compressed layer 20 beneath the shoe 25.

The shoe 25 is equipped with means for shaving the top of the partially compressed layer 20 so as to remove undesirable humps or excessive thicknesses. The fibers and the binders at this stage have not been heated enough to cure the resin so the fibers will expand more where there are lumps when released from the pressure exerted by the belt 19. The shoe 25 is provided with a bottom channel 26 extending all the way across the shoe and the partially compressed layer 20 of the fibers. A fan 27 has a connection 27a to the channel 26 so as to force out the shaved off fibers which are shaved off in the channel 26. The shaving device comprises a twisted band saw 28 which has one flight going through the channel 26 and the return flight going over the belt 19 as illustrated in FIGURE 3 of the drawings. A guide pulley 29 is shown in FIGURE 3 as guiding one end of the saw 28. I have found that this shaving means is quite satisfactory when the saw is run at high speed, although of course, other suitable shaving means could be used in the channel 26.

The belt 19 and the layer 20 are brought together as they leave the shoe 25 beneath a roller 30. A suitable drive motor 31 and a gear box 32 are illustrated in FIGURE 2 as the means to drive the belt 19. Between the shoe 25 and the roller 22 additional heat is applied through the belt 19 to the layer 20 of fibers by another heated platen 33. The side edges of the now continuous web or layer of fibers 20 are compacted as they leave the belt 19 by small edge belts 34 and 35 which run in contact with the side edges of the layer 20 on the belt 17. Rollers 36 and 37 are provided with vibrating mechanisms as indicated at 38 and 39 to vibrate the belts 34 and 35 with a low amplitude vibration so as to compact the edges of the layer 20.

When the fiber layer 20 leaves the edge compacting belts 34 and 35, the first precompression stage in the making of the wall board is completed. The next stage of operation is to compress the board down substantially to its final thickness and further heat it and iron it while it is so compressed so as to make a soft board that is not yet cured, but that will have sufficient strength that it can be handled for certain purposes. The layer 20 is delivered onto a belt 40 which travels over a heated platen 41 and carries the partially compressed layer 20 of fibers and binder beneath another belt 42 which travels around rollers 43, 44 and 45. The roller 44 is offset downward as illustrated, so as to be the compression roller that compresses the layer 20 to the thickness that enables it to be handled without breakage in the rest of the process. The belt 42 has heat applied to it by a heated platen 46 as it approaches the layer 20. After the belt 42 and the layer 20 have passed beneath the roller 44, they then are carried under another heated platen 47 which is held down by hydraulic jacks 48 and 49 to maintain the proper pressure on the layer 20 for ironing and setting it before it is released from pressure. As the now soft board web, made up of the layer 20, leaves the belt 42, a travelling cut off device 50 cuts the soft board into uniform length by travelling with the belt 40 while making the cut and then returning to starting position for the second cut. These travelling cut offs are well known and therefore the details of them have not been illustrated herein.

The steel belt 40 is normally a continuation of the belt 17, although if desired, they may be separate belts. I prefer, however, to use a non-metallic material that has a low coefficient of friction for the belt 19. A belt which is desirable for this purpose is Teflon-fiber glass belt. If desired, a similar belt could be used for the belt 17 if high frequency heating were to be used after the fibers are compressed. However, the particular material of which the belts are made can obviously be varied to obtain the best desired results and my invention is not limited to any particular type of belt. The platens 46 and 47 should be faced with a material of low friction coefficient in order to provide a minimum of wear on the belt 42. However, it should be noted that the pressure of the platen 47 on the compressed web 20 need only be sufficient to retain it at the desired thickness because the roller 44 is the main compression roller.

Figure 5:
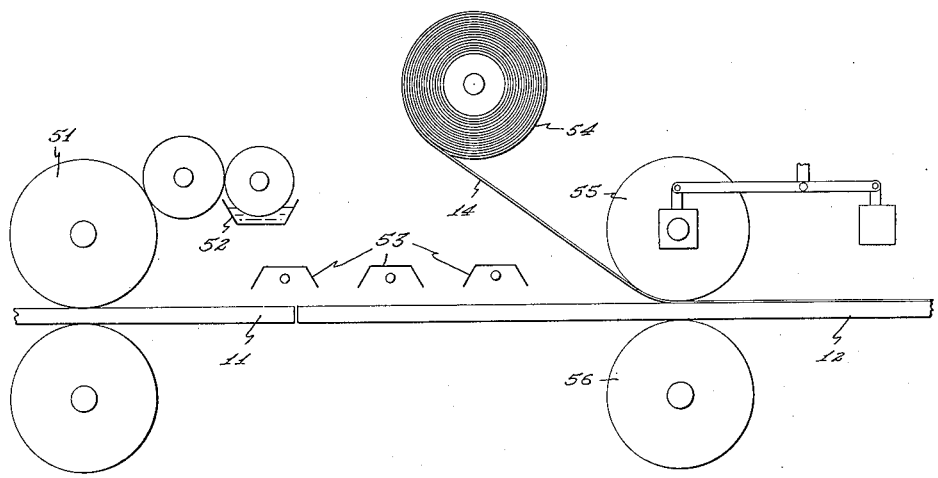
FIGURE 5 is a side view illustrating the apparatus for applying a metal foil or sheet to one face of each board delivered from the apparatus of FIGURE 4.
Figure 6:
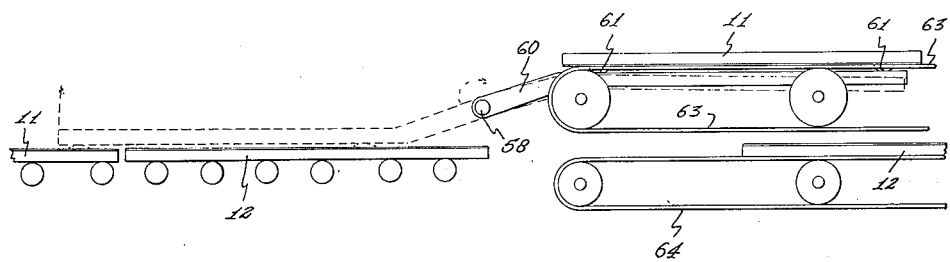
FIGURE 6 is a side view illustrating a separating and turning mechanism adapted to lift alternate boards and invert them upon a support which is spaced above the conveyor for the remaining boards.
Figure 8:
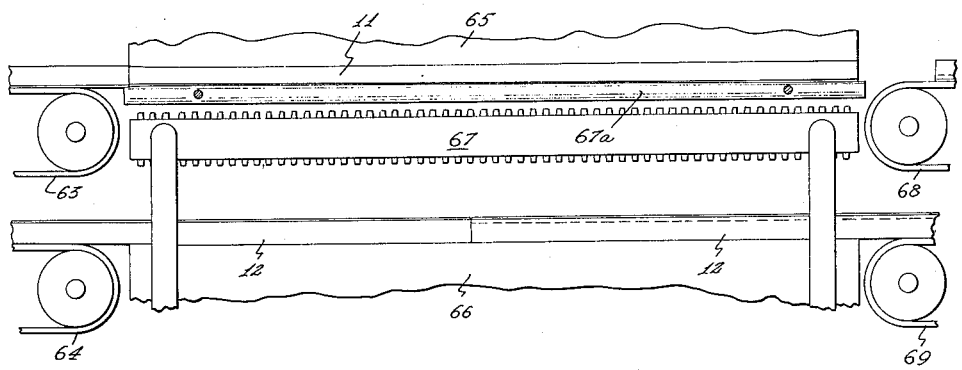
FIGURE 8 is a side view illustrating the embossing and curing press operation.

The boards cut off after compression are now in condition to be faced with the sealing sheet facings 13 and 14. The facing operation is illustrated in FIGURE 5 where the boards such as 11 and 12 are passed end to end beneath a coating roller 51 which is coated with a suitable adhesive resin from a coating supply trough 52. The adhesive coating is next warmed and partially dried by a plurality of infrared heaters 53 until it is tacky and ready to stick to the facing 13—14 which is drawn off a roller 54. The facing 13—14 and the boards 11 and 12 pass between two calendering rolls 55 and 56 which press the facing into intimate contact with the boards 11 and 12. These boards are next fed onto a turning and separating device which is illustrated in FIGURES 6 and 7. The turning and separating device comprises a rock shaft 58 which carries arms 59 and 60 that in turn mount a plurality of suction cups 61. The connections by which the suction cups are connected to a vacuum source are not illustrated since they are well known. The turning mechanism just described is moved down onto alternate boards 11 and 12 as they advance from the calendering rolls 55 and 56 are cut apart by a suitable foil cutting device, not shown. The suction cups 61 pick up the boards 11, leaving the boards 12 to travel onward and by swinging upwardly and then downwardly between two spaced apart belts 62 and 63, the suction devices tip the boards 11 on the belts 62 and 63 with the facing sheet 13 now downward. The boards 12 are fed forwardly onto a conveyor 64 beneath the belts 62 and 63 in order to have a lower board with its foil faced surface upward in position for action by the embossing press. The embossing press is illustrated partly in FIGURE 7 and generally in FIGURE 8. The detailed controls of course, are not shown because they are common in hydraulic presses.

Figure 9:
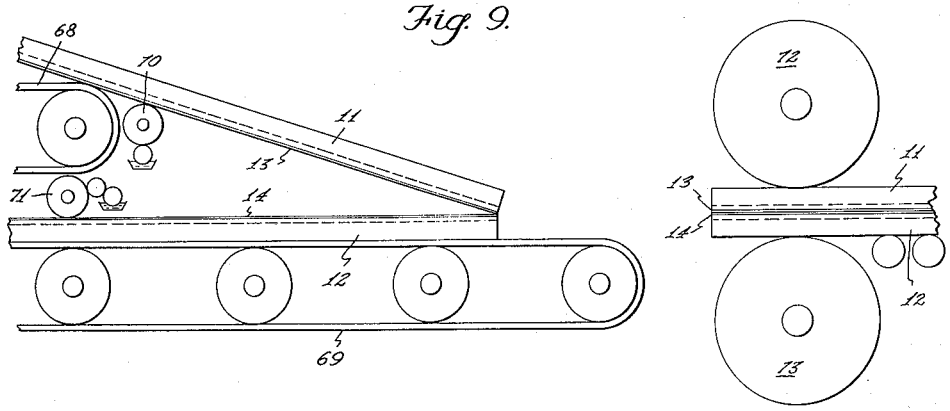
FIGURE 9 is a side view illustrating the steps of putting adhesive on the embossed cured boards and pressing them together.

The press comprises an upper stationary platen 65, a lower stationary platen 66 and an embossing movable platen 67 between. The platen 67 has its upper and lower faces shaped like a waffle iron, that is, with shallow channels from which projections rise as isolated knobs through the surface. The particular pattern or configuration of the surfaces of the platen 67 may be varied but the two surfaces should be alike so that the embossing done on the boards 11 will match the embossing done on the boards 12. The platen 67 is first moved down against a board 12 to emboss it. At the same time the final heating takes place to cure the resin while the board is engaged between the platens 66 and 67. When the board 12 is finished the platen 67 moves up against the board 11 which in the meantime has been retained by side supports 67a. These side supports are at the extreme outer edge of the board and swing out of the way of the rising platen 67 when the platen is in position to receive the board 11. The bottom surface of the board 11 is embossed and this board is cured by the heat and pressure from the platens 65 and 67. The individual boards 11 and 12 now have the surface configuration illustrated, for example, in FIGURE 10. In order to complete the board 10 it is necessary to put the board portions 11 and 12 together. The board portions 11 and 12, of course, are separated and moved alternately forward as they leave the embossing press. The board 12 is moved off the embossing press while the platen 67 is embossing the board 11. It is necessary therefore to feed the two boards 11 and 12 onto controlled conveyors 68 and 69 which serve to bring the boards to the discharge end of the conveyors, illustrated in FIGURE 9, so that the board 11 can be dropped down onto the board 12 and aligned with the board 12. The embossed faces of the boards 11 and 12 are adhered to each other by spreading an adhesive on one or both of them. Adhesive spreaders are shown at 70 and 71 in FIGURE 9. The lower conveyor 69 carries the two boards 11 and 12 together to a set of calendering rolls 72 and 73 which press the boards into intimate engagement with each other.

The resulting board is essentially of the construction illustrated in FIGURE 11. All that is necessary to complete it is to trim the sides and ends of the assembled board to the exact dimensions. The assembled board is now ready for use since the final curing was accomplished in the embossing press except for the setting of the adhesive that is applied to the embossed surfaces to secure the two board portions 11 and 12 together. This adhesive is a relatively low temperature setting adhesive and is normally sufficiently set after passing through the calendering rolls 72 and 73.

The resulting wall board is strengthened by the embossing operation which increases the density of the board wherever it is embossed without increasing the total weight. Due to the continuous type of operation the sheets can be made in large sizes and handled readily. The provision of the double sheet layers with air pockets between them along the center plane of the assembled board gives insulating and heat reflecting advantages in both directions and also provides a vapor barrier so that at least the cold half of the board will not absorb vapor from the warm side of the board. This is particularly important because in most buildings where this type of board is used in the walls, the warm air inside the building may contain enough moisture to actually cause a serious condensation in the board. The air pockets slow down heat flow from one side to the other even when the warm side is wet by condensation. The foil between the two board portions 11 and 12 is protected against breaks in handling and this insures protection of the vapor barrier. The embossing gives much greater rigidity to the board than can be obtained without it. This makes it possible to have larger sheets of boards stiff enough to handle.

The steps of partially compressing the layer 20 of fibers and then shaving off the humps with the shaving device 28 in the channel 26 of the shoe 25 provides smooth surfaces free of the lumps that are apt to occur at the top of a layer of fibers upon a belt. The fibers lay down quite smoothly on the belts 17 and 40. The outer faces of the board 10 are the surfaces that are formed upon the belts 17 and 40. By shaving the other surface it is made smooth to receive the very thin sheet 13 or 14 of metal or plastic with a minimum of distortion of the sheet.

It is believed that the nature and advantages of my invention will be clear from the foregoing description.

Having thus described my invention, I claim:

1. A process for manufacture of fibrous boards comprising compressing fibrous material and thermo setting adhesive into boards, partially curing the adhesive, adhering thin flexible, vapor tight sheets to one face of each of said boards thereby covering said face, heat embossing the covered faces of the boards, whereby to provide a plurality of indentations in said faces and whereby to completely cure the thermo setting adhesive, and adhering the raised portions of the embossed faces of two boards together to form a wall board having hermetically sealed air spaces and a heat reflecting and moisture sealing barrier between two fiber layers.

2. A process for the manufacture of fibrous boards comprising first laying thick mats of felted fibers and a thermo setting adhesive, heating and compressing the mats until they form boards stiff enough to handle and until the adhesive is partially cured, adhering thin flexible, vapor tight sheets to one face of each of the boards thereby covering said face, pressing said covered faces against a heated and embossed surface whereby to emboss said faces and form indentations therein and to completely cure the boards, and then adhering the raised portions of the embossed pieces of two of the boards together to form a wall board having hermetically sealed air spaces at its center and having heat reflecting and moisture sealing surfaces at its center.

3. A process for the manufacture of fibrous boards comprising first laying thick mats of felted fibers and a thermo setting adhesive, heating and compressing the mats until they form boards stiff enough to handle and until the adhesive is partially cured, coating one face of each of said boards with an adhesive, partially drying said coating, pressing thin flexible, vapor tight sheets into intimate contact with the coated faces of said boards thereby covering said face, heat embossing said covered surfaces whereby to form indentations therein and to completely cure the boards, and then adhering the raised portions of the embossed surfaces of two boards together to form a wall board having hermetically sealed air spaces at its center and having heat reflecting and moisture sealing surfaces at its center.

4. A process for the manufacture of fibrous board comprising first laying a thick mat of felted wood fibers and a thermo setting adhesive, heating and partially compressing the mat, further heating and compressing the mat until it is stiff enough to handle, cutting the mat into board sections of uniform length, coating the upper surfaces of said sections with an adhesive, heating and partially drying said coating of adhesive, applying thin flexible, vapor tight sheets to said upper surfaces, pressing said sheets into intimate contact with said surfaces, pressing said sheet covered faces against a heated embossed surface whereby to form indentations in said sheets and said surfaces and to completely cure the thermo setting adhesive in said boards, coating the embossed faces of at least every other board with an adhesive and then pressing the boards together in pairs with their embossed faces in contact whereby to form one wall board having hermetically sealed air spaces at its center and having a heat reflecting and moisture sealing metal portion at its center.

5. A board comprised of two board portions of compressed fibrous material adhered to each other in face to face relation, the outer faces of said board portions being planes substantially parallel to each other, each board portion having spaced part sections therein of increased density and reduced thickness along the outer face thereof, spaced from the other board portion thereby providing separate pockets between the portions, at least one of said board portions having supported thereon and adhered thereto a foil sheet covering and conforming to the face thereof toward the other board portion providing a vapor barrier between said board portions.

6. A board comprised of two board portions of compressed fibrous material adhered to each other in face to face relation, the outer faces of said board portions being planes substantially parallel to each other, each board portion having spaced apart sections therein of increased density and reduced thickness along the outer face thereof, spaced from the other board portion thereby providing separate pockets between the portions, each of said board portions having supported thereon and adhered thereto a foil sheet covering and conforming to the face thereof toward the other board portion providing a vapor barrier between said board portions, and providing spaced foil enclosed air pockets between each matching pair of said sections of increased density and reduced thickness.

7. The process of manufacturing boards from a fibrous material-thermo-setting adhesive mixture and flexible vapor tight sheet material which comprises laying the mixture into a thick mat, compressing and shaving the mat to uniform thickness, then further compressing and heating the mat, adhering to one face thereof the flexible vapor tight sheet material, then finally curing and embossing the mat from the face covered with the sheet material thereby forming spaced apart sections of high density adjacent to the other face of the mat, then adhering the embossed faces of two such mats together.

References Cited in the file of this patent

UNITED STATES PATENTS

| | | | |
|---|---|---|---|
| 1,175,376 | Patee | Mar. 14, | 1916 |
| 1,461,337 | Weiss | July 10, | 1923 |
| 1,744,345 | Swanson | Jan. 21, | 1930 |
| 1,878,086 | Woodall et al. | Sept. 20, | 1932 |
| 1,952,208 | Hussey | Mar. 27, | 1934 |
| 2,173,815 | Slisz et al. | Sept. 19, | 1939 |
| 2,175,630 | Kiesel | Oct. 10, | 1939 |
| 2,179,057 | Schuetz | Nov. 7, | 1939 |
| 2,233,190 | Amorosi | Feb. 25, | 1941 |
| 2,261,730 | Mitman | Nov. 4, | 1941 |
| 2,343,740 | Birmingham | Mar. 7, | 1944 |
| 2,377,484 | Elmendorf | June 5, | 1945 |
| 2,581,605 | Scholl | Jan. 8, | 1952 |
| 2,693,619 | Goss | Nov. 9, | 1954 |
| 2,704,965 | Seybold | Mar. 29, | 1955 |
| 2,745,173 | Janos | May 15, | 1956 |
| 2,747,651 | Lighter | May 29, | 1956 |